Aug. 10, 1954     P. A. STREICH ET AL     2,685,705
SHRIMP CLEANING AND DEVEINING MACHINE
Filed May 5, 1951     3 Sheets-Sheet 1
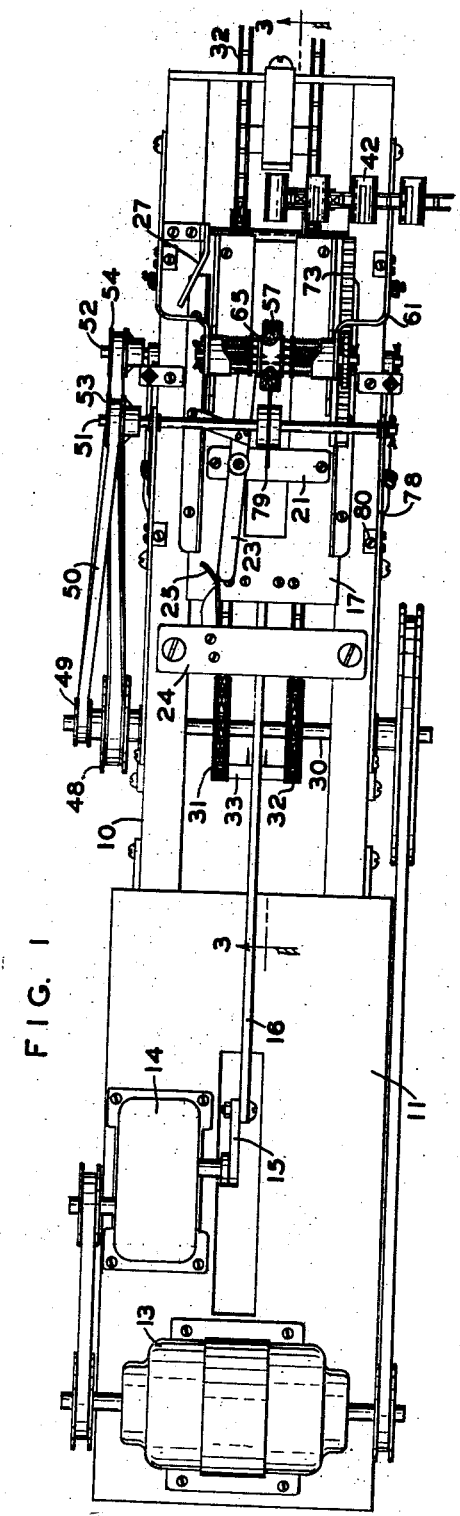
INVENTOR.
PHILIP A. STREICH
EMMITTE P. TAIT
VIRGIL R. CLARK
BY
ATTORNEY

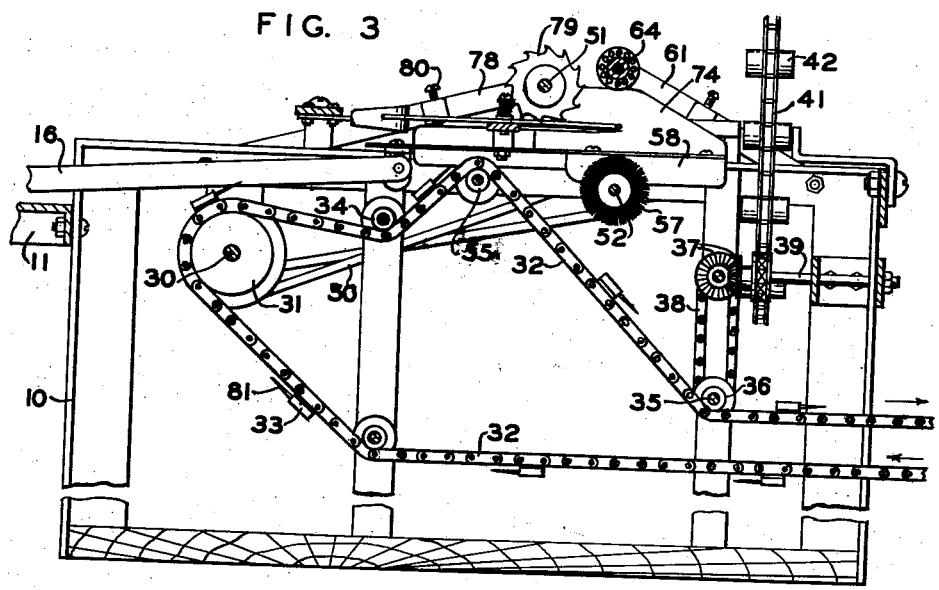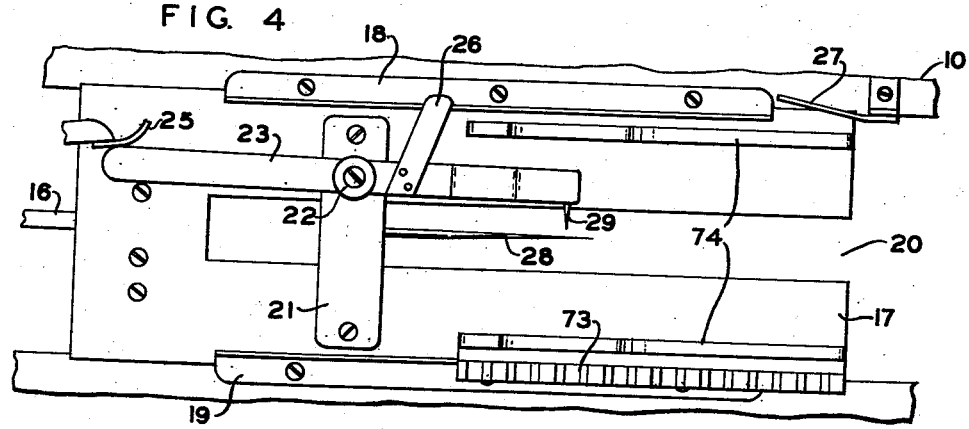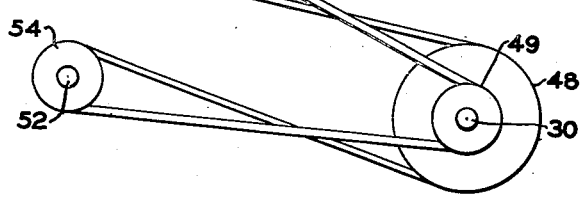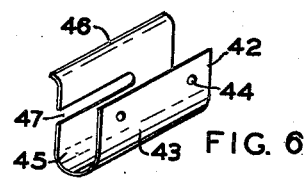

Aug. 10, 1954 P. A. STREICH ET AL 2,685,705
SHRIMP CLEANING AND DEVEINING MACHINE
Filed May 5, 1951 3 Sheets-Sheet 3

INVENTOR.
PHILIP A. STREICH
EMMITTE P. TAIT
BY VIRGIL R. CLARK

ATTORNEY

Patented Aug. 10, 1954

2,685,705

UNITED STATES PATENT OFFICE 2,685,705

SHRIMP CLEANING AND DEVEINING MACHINE

Philip A. Streich, Philadelphia, Pa., and Emmitte P. Tait, Atlanta, and Virgil R. Clark, Decatur, Ga., assignors to Tait-Clark-Streich Machinery Corp., Decatur, Ga., a corporation of Georgia Application May 5, 1951, Serial No. 224,712

11 Claims. (Cl. 17—2)

Our invention relates to a shrimp cleaning and deveining machine arranged not only for stripping the outer shell from the shrimp but also for removing the vein from both the top and bottom of the body.

Before the advent of the frozen food industry, the procedure of handling shrimp was somewhat as follows. The shrimp were taken from their native waters by the shrimp fishermen, immediately decapitated and placed in cold storage compartments on board the ship. When the catch was brought into port, the shrimp were transported as quickly as possible to the dealers whose responsibility it was finally to clean and prepare the shrimp for the consumer. In many instances, no further processing was done at all to the shrimp, but they were left, as caught, for the final cleaning by the consumer. It is readily apparent that unless properly iced when shipped, the spoilage of a quantity of shrimp would be considerably high; and, unless extra precaution were taken they would not be usable at all if their destination were far removed from the point of shipment.

Since the rapid expansion of the frozen food industry, it has been highly desirable to clean and freeze the shrimp as soon as possible after they are caught, so that the spoilage will be held at a minimum and the freshness of flavor will not be lost. Moreover, by quick-freezing, the shrimp may be shipped to far removed destinations and will reach the consumer in a form where no further processing is required.

So far as is presently known, the shrimp are prepared for freezing entirely by hand, the workmen stripping and cleaning the shrimp for quick-freezing on a pound basis. Since the average production of a single operator is only 70 to 90 pounds daily, it is apparent that several hundred workmen must be kept busy if the shrimp are moved in any quantity.

It is an object of the present invention to provide a machine for cleaning shrimp which strips the outer shell from its body and removes the top and legs.

Another object of the invention is to provide such a machine which will clean and devein shrimp in quantity more than ten times faster than the average hand operator.

A further object of the invention is to provide a shrimp cleaning machine which includes a pair of conveyor chains, the shrimp being "loaded" onto one of the chains, subsequently passed between a saw and stripping brush for stripping and deveining, and finally deposited on a disposal chain which carries the shrimp away from the machine for washing and packing.

Other objects and advantages, such as adjustments, speeds and timing will be found in the course of the following detailed description when viewed together with the accomypanying drawing in which:

Fig. 1 is a top view of an embodiment of my invention in a shrimp cleaning machine.

Fig. 2 is a partly broken, side elevational view thereof.

Fig. 3 is a cross-sectional view taken along line 3—3 of Fig. 1.

Fig. 4 is an enlarged view of the transfer rack which is used to transfer the shrimp from one of the conveyor chains to the other.

Fig. 5 is a schematic diagram of the pulley arrangement used in rotating certain shafts of the machine.

Fig. 6 is a detail view of one of the cups used for holding a shrimp in position on the loading chain.

Figure 7:
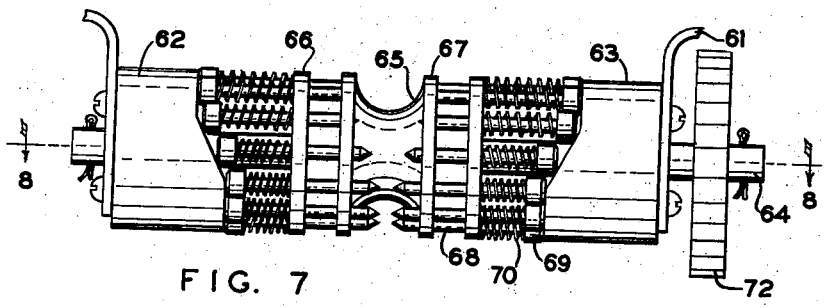
Fig. 7 is an enlarged side view of a novel cam arrangement used to remove the shell from the shrimp body.
Figure 8:
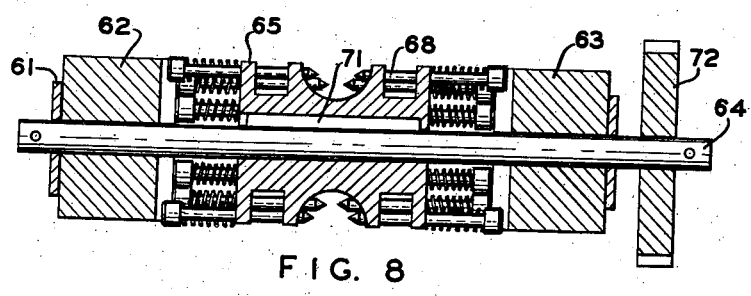
Fig. 8 is a cross-sectional view of the cam arrangement taken along the line 8—8 of Fig. 7.

In the drawing, numeral 10 designates generally the machine frame which is made more or less in the form of a table with suitable legs and is provided with a platform 11 at the rear end thereof, the platform being extended in cantilever fashion and provided with a lower set of braces 12. Upon the platform 11 we have provided an electric motor 13 adapted to drive a speed reducing unit 14 by means of a connecting belt and pulleys. The output shaft of the speed reducer 14 is provided with a crank arm 15, the outer end of which is pivotally connected with the end of a crank bar 16 which is made to reciprocate longitudinally as the crank arm 15 is rotated by the speed reducer 14.

In Fig. 1, it will be noted that the inner edges of the upper side rails of the frame 10 constitute a track for a slidable transfer rack denoted generally by the numeral 17. This rack 17 is shown more clearly in Fig. 4 as being simply a flat plate slidably positioned beneath two side guide members 18 and 19 to make the same move in a substantially true plane as it is pushed and pulled by the crank bar 16. As also shown in this figure, the rack 17 is provided with a slot 20 starting from the forward end and extending almost the entire length of the rack. Bridging this slot 20 is a strut 21 provided with a pivot pin 22 affixed to its upper surface. Pivotally mounted on this pin 22 at its approximate midpoint is a picker bar 23.

As shown in Fig. 1, the two side rails of the frame 10 are provided with a cross strut 24 positioned just beyond the limit of travel rearwardly of the transfer rack 17. This strut 24 is provided with a curved stop 25 placed in the path of the rear end of the picker bar 23 to partially rotate the same in a counterclockwise direction. On the opposite end of the picker bar 23 we have provided an arm 26 engageable with a stop 27 affixed to the frame 10, which stop is arranged to pivot the picker bar 23 in a clockwise direction when the transfer rack 17 is in its extreme forward position.

In Fig. 4 we have shown the strut 21 on the transfer rack as being provided with a single long needle 28 and the forward end of the picker bar 23 as having a short needle 29. From the description thus far, it can be seen that when the transfer rack 17 is moved forwardly, the long needle 28 might be able to pierce the body of the shrimp longitudinally, while the short needle 29 of the picker bar 23, co-acting with the stop or forward cam 27, as above described, is thrust into the side of the shrimp so that the shrimp body may be held on the needle 28 for the cleaning process as will be described later. Nearing the extreme reverse stroke of the transfer rack, the rear end of th picker bar 23 strikes the rear cam stop 25 to release the side needle 29 so that the body of the shrimp might be removed from the long needle 28 in the manner illustrated in Fig. 9. This operation will be more completely described later in the specification.

Referring again to Fig. 1, it is seen that while the motor shaft is driving the speed reducer 14 on one side, it is simultaneously driving a jackshaft 30 on the other side by means of a belt and pulleys. The jackshaft 30 is rotatably journaled through the machine frame 10 and arranged to drive a pair of sprockets 31 carrying a delivery chain 32. Actually this delivery chain 32 consists of two separate chains linked together by means of bars 33. As shown in Fig. 3, the chain 32 is driven immediately beneath the upper side rails of the machine frame under one idler roll 34, over a second idler roll 55, and from thence slants downwardly and is passed beneath a forward jackshaft 35 and on, in the direction of the arrow, to a point of delivery from whence it is finally returned and again brought over the driving sprockets 31.

The forward jackshaft 35 carries a driving sprocket 36 which is made to rotate a pair of bevel gears 37 by means of a separate chain 38. The gears, in turn, are finally made to rotate a drive shaft 39 carrying a sprocket 40 suitable for moving a feeder chain 41. This feeder chain is illustrated more or less diagrammatically in Fig. 11 which shows the chain defining a right triangle, the base of which is intended to be in perfect vertical alignment with the longitudinal axis of the machine. The feeder chain 41 is provided with cups 42 made of thin sheet metal and formed into the shape more clearly illustrated in Fig. 6. Here is shown the cup as provided with one relatively flat side 43 adapted to lie flat against the chain link and held to the same by passing bolts or rivets through the holes 44. The metal of the cup is bent upon itself to form a pocket 45 of a size suitable for embracing the average size shrimp body and holding it out straight. The outer lip 46 is turned outwardly to facilitate an operator in loading the shrimp into the cup. It will be noted here that the outer side of the cup is provided with a slot 47. This slot is formed into the side of the cup to permit the needle 29 of the picker bar 23 to be thrust into the side of the shrimp body to remove it from the cup 42 onto the transfer rack 17. The spacing of the cups 42 on the feeder chain 41 is such that when the transfer rack 17 is moved forwardly in the machine, there will be a loaded cup in direct alignment for the pickup as formerly described by the movement of the transfer rack.

Figure 11:
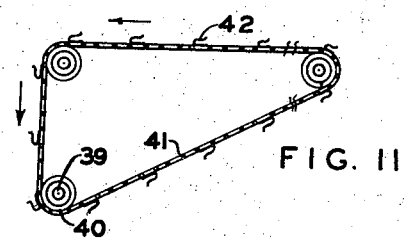
Fig. 11 is a schematic view of the loading chain.

While the view of the feeder chain 41 is shown in relatively small proportion in Fig. 11, it is actually intended to extend outwardly from the machine frame to such an extent that an operator is permitted to sit beside it for loading.

Reference is now made to the mechanism for performing the first operation on the shrimp after it has been taken from the feeder chain and placed on the transfer rack. Fig. 1 illustrates the jackshaft 30 as being provided with a pair of pulleys 48 and 49. Passed over the pulleys 48 and 49 is an endless belt 50 arranged to simultaneously rotate a saw arbor 51 and a brush arbor 52 by means of pulleys 53 and 54 respectively.

The ends of the brush arbor 52 are rotatably mounted in the end of a pair of side arms 56, the opposite ends of which are pivotally joined to the upper side rails of the frame 10 in such manner as to permit the arbor 52 to be raised in an arcuate movement into an operative position or lowered into an inoperative position. The arbor 52 is made to rotate a wire brush 57 placed longitudinally along the arbor at such a position as to be in direct alignment beneath the moving body of the shrimp carried by the transfer rack. When rotated by the belt 50, the brush 57 is adapted to brush off the delicately formed legs of the shrimp. Moreover, the brushing action disconnects the shell of the shrimp by severing the thin membrane on the lower side of the shrimp body so that the peeling off of the shell may be accomplished by a series of cam actuated fingers which will be described in the second operation of cleaning.

Affixed to the underside of the transfer rack is a plate 58 having the inner end thereof beveled in the manner shown in Fig. 3. This plate serves as a cam and is adapted to strike the brush arbor 52 when the transfer rack is being drawn rearwardly so that the brush may remove the legs of the shrimp but will leave the tail of the shrimp intact. In Figs. 2 and 3, the brush 57 is shown as being pushed away from the path of travel of the shrimp by the above described cam action. In Fig. 2, the side arms 56 are shown as provided with a tension spring 60 having one end connected to the arm and the opposite end attached to a pair of saw arms which will be described in another operative mechanism of the machine. It is now apparent that when the transfer rack 17 is moved forwardly to receive a shrimp from the feeder chain 41, the brush 57 is raised, by action of the tension spring 60, into an operative position. To limit the upward travel of the brush 57, I have provided an adjustable stop 59 affixed to the side rails of the frame 10 and arranged to contact the side arms 56 to limit the upward travel thereof.

The mechanism for performing the second in the sequence of cleaning operations on a shrimp consists of a pair of arms 61 having one of their ends pivotally mounted on the bed of the machine. Each of the upper ends of these arms firmly supports one of two oppositely disposed cams 62 and 63. As illustrated in Fig. 7, each of these cams is rigidly fixed to its supporting arm and has its inside face formed as a cam surface as shown. The cam shaft 64 is rotatably journaled not only through the supporting arms 61 but also slidably extended through each of the cams 62 and 63. Centrally disposed on the cam shaft 64 is a pin bushing 65 turned in the shape shown to form two pairs of flanges 66 and 67 on each end of the bushing. Circumferentially spaced around both pairs of these flanges are oppositely disposed holes adapted to receive pins 68 in the manner shown. Each pin is provided with an enlarged head 69 arranged to be urged against the curved surface of its respective cam by a compression spring 70 encircling the pin beneath the head with the opposite end of the spring resting against one of the flanges 66 or 67. While both the cams 62 and 63 remain stationary, the pin bushing 65, and consequently all of the pins 68, are made to rotate by means of an internal key 71 locking the bushing to the cam shaft 64.

On the outer end of the cam shaft 64 I have affixed a small spur gear 72 engaged with a rack 73 which is also carried by the reciprocative transfer rack 17. Thus it can be seen that when the transfer rack is moved backward and forward between the upper side rails of the machine frame, the cam shaft 64 is made to rotate correspondingly, and consequently to move the individual pins 68 toward and away from each other according to the surface of their associated cams 62 and 63. It will be noted that the inner ends of the pins are pointed so as to pierce the hard shell of the shrimp as it is moved by the transfer rack. The machine is so timed that as soon as the shell is parted from beneath by the wire brush 57, the pins 68 lift the shell from the longitudinally moving body and release it so that it might fall into a receptacle (not shown) placed beneath the machine bed.

Affixed to the transfer rack 17 on the upper side are two identical plates 74 standing upright and having the forward top edges serving as a cam surface arranged to lift the cam shaft 64 by being forced under each of the stationary cams 62 and 63 as the transfer rack is moved rearwardly. This lifting action pivots the side arms 61 upwardly, completely disengaging the rack and gear. The purpose of the movement is to allow the lifting pins 68 to grip and peel off only the hard shell of the longitudinally moving shrimp body without gripping the tail portion. It is readily seen that when the transfer rack is again moved into a forward or receiving position, the cam surfaces will allow the rack and pinion to be re-engaged by means of their own weight and assisted by a tension spring 75 attached to the arms and machine bed.

The mechanism for performing the third cleaning operation on the shrimp consists of providing another pair of side arms 78 hinged to the machine bed much in the same manner as the arms supporting the cam shaft on the forward end of the machine. These arms support a saw arbor 51 which is rotatably mounted in the upper ends thereof and which is arranged to be rotated by the rear jackshaft 30 and belts and pulleys. Mounted on a medial portion of the arbor 51 is a slitting saw 79 adapted to rotate with the arbor 51 on which it is mounted and so positioned as to be in direct vertical alignment with the longitudinal axis of the long needle 28 carried by the transfer rack 17. The proximity of the saw to the needle as it passes beneath the saw may be adjusted by means of an adjusting screw 80.

The cam plates 74, which disengage the rack and pinion, are also made to strike the saw arbor 51 and thus lift the saw 79 to prevent it from cutting the shrimp for its entire length. The timing is made such that the lifting of the saw takes place only after the upper vein has been removed from the shrimp body, but before the saw enters the tail portion thereof. If it is desired to "butterfly" the shrimp, that is, to saw or split the body almost completely in half, the saw may be lowered to make the cut by adjusting the stop 80. Fig. 3 shows a tension spring connecting the pair of arms 56 which support the brush arbor 52 with the saw arms 78. Thus, when the transfer rack is drawn rearwardly, the action of the cam plates 74 and 59 moves the two sets of arms in opposite directions, putting additional tension upon the springs 60, which finally assist in returning the arms to an operative position when the transfer rack is again moved forwardly into a loading position.

In the description thus far, the body of the shrimp has been loaded into cups, transferred to a moving carriage, stripped of its legs and outer shell and completely deveined. The following mechanism will describe the manner of removing the cleaned body of the shrimp from the transfer rack whereby the same may be taken to some place removed from the machine for packing or further processing.

Figure 9:
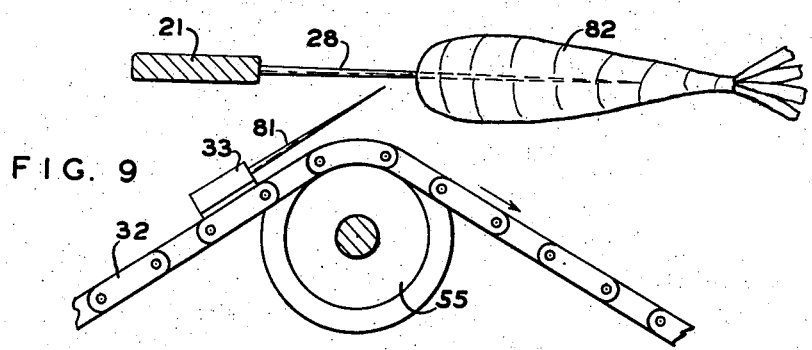
Fig. 9 is a detail view showing the mode of removing the cleaned body of a shrimp from the transfer rack to the removal chain.
Figure 10:
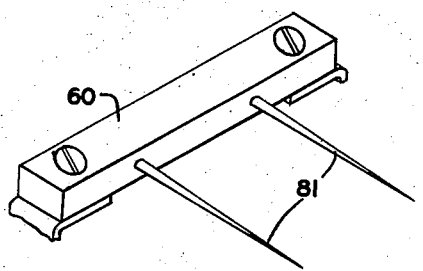
Fig. 10 is an enlarged, detail view of one of the picker bars of the removal chain which is used to remove the shrimp body from the transfer rack.

It will be remembered that the lower delivery chain 32 actually constitutes a double chain held together by bars 33. Each of the spacer bars 33 mounted on the delivery chain 32 is provided with a pair of spaced pickup needles 81 jutting forwardly of the bar in the direction of travel of the chain. The pick-up needles are so spaced and timed with respect to the needle 28 of the transfer rack 17 that when the body of the shrimp has been relieved of its shell and has been deveined by the brush 57 and the saw 79, the needles 81 are thrust into the shrimp body 82, as shown in Fig. 9, to remove it from the needle 28 and carry it to some point of delivery removed from the machine itself. It will be remembered that the side needle 29 (Fig. 4) has been released at this time so that the shrimp may be taken from the needle 28 with comparative ease and without tearing the meat.

Having described in detail the various components and assemblies of the machine and their various functions, a brief résumé of a complete operation will follow.

Let it be assumed that an operator is seated near the feeder chain and is placing a shrimp in each of the cups 42 with the tail of the shrimp body faced away from the slitting saw. As the shrimp are brought by the feeder chain toward the machine, they are suddenly turned and fed vertically in the manner described above. When the slidable transfer rack 17 begins to move toward the front of the machine, its receiving needle 28 is thrust into the shrimp body carried by the cup on the feeder chain. Simultaneously, the needle 29 of the picker bar 23 is thrust, by action of the cam 27, into the side of the shrimp body. As the transfer rack 17 is pulled rearwardly, the shrimp body is withdrawn from the cup 42 on the feeder chain and moved into the path of the wire brush 57. This brush brushes off the legs of the shrimp. Moreover, by such brushing, the thin membrane joining the outer hard shell of the shrimp is parted. Before the shrimp has passed completely over the brush, the lower cam plates 58 move the brush downwardly so as to leave the tail of the shrimp intact.

Almost simultaneously with the action of the brush, the pins 88 of the upper cam shaft assembly have gripped the hard outer shell and begun to peel it off, finally releasing their hold so that the shell may fall into a receptacle placed beneath the machine. This entire assembly is also moved away from the shrimp body by action of the upper cam plates 74 so as to leave the tail of the shrimp intact.

The transfer rack continues to move rearwardly, bringing the upper side of the peeled shrimp into alignment with the slitting saw 79 which removes the upper vein in the shrimp body and is itself removed from such cutting position, just before slitting the tail of the shrimp, by action also of upper cam plates 74.

When the transfer rack nears the end of its rearward stroke, the end of the picker bar 23 strikes another cam 25 which removes the side needle 29 from the body of the cleaned shrimp. Simultaneously with this movement, the delivery chain has moved one of its bars 33 into such a position that its pick-up needles 81 are thrust into the body of the shrimp in the manner shown in Fig. 9, to remove it entirely from the transfer rack and carry it from the machine to some remote position where it may be removed for packaging or further processing. The transfer rack then again moves forwardly for another loading and the cycle is repeated.

From the above description of construction and operation, it can be seen that we have provided an unique and valuable machine in which shrimp are loaded and then cleaned without the meat ever again being touched by human hands. Moreover, the machine is adaptable to many changes in its installation. For example, water may be sprayed onto the shrimp as desired, and the final delivery chain may be made to pass through a water spray for a final cleaning process or the feeder chain may be extended to an entirely separate room where the actual loading takes place. The machine may be constructed in "batteries" or banks wherein all of the various shafts may be rotated simultaneously by a single source of power. Other changes may be made in the construction without departing from the scope of the invention as defined by the following claims.

We claim:

1. In apparatus for cleaning and deveining shrimp, a supporting structure, a rack mounted on said supporting structure for movement of shrimp along a predetermined path, motive power means connected to said rack for imparting movement to said rack, cleaning means mounted on said supporting structure and positioned adjacent the path of movement of said rack so as to engage the legs of a shrimp carried by said rack, said cleaning means connected to said supporting structure being operable to remove the legs from shrimp carried by said rack, shell removing means mounted and positioned on said supporting structure adjacent the path of movement of said rack so as to engage the shell of a shrimp carried by said rack, said shell removing means being operable to remove the shell from a shrimp carried by said rack, and cutter means mounted and positioned on said supporting structure adjacent the path of movement of said rack so as to engage the back of a shrimp carried by said rack after at least a portion of the shell has been removed and to slit the shrimp for removal of the vein in the back thereof.

2. In apparatus for cleaning and deveining shrimp, a supporting structure, a rack mounted on said supporting structure for movement of shrimp along a predetermined path, conveyor means connected to said supporting structure for feeding shrimp onto said rack, delivery means connected to said supporting structure for removing shrimp from said rack, motive power means connected to said conveyor and delivery means for imparting cooperative movement to said conveyor and said delivery means and said rack, cleaning means mounted on said supporting structure and positioned adjacent the path of movement of said transfer rack so as to engage the legs of a shrimp carried by said rack, said cleaning means being operable to remove the legs from shrimp carried by said rack, shell removing means mounted and positioned on said supporting structure adjacent the path of movement of said rack so as to engage the shell of a shrimp carried by said rack, said shell removing means being operable to remove the shell from a shrimp carried by said rack, and cutter means mounted and positioned on said supporting structure adjacent the path of movement of said rack so as to engage the back of a shrimp carried by said rack after at least a portion of the shell has been removed and to slit the shrimp for removal of the vein in the back thereof.

3. In apparatus for cleaning and deveining shrimp, a supporting structure, a rack mounted on said supporting structure for movement of shrimp along a predetermined path, motive power means connected to said rack for imparting movement to said rack, cleaning means rotatably mounted and positioned on said supporting structure adjacent the path of movement of said transfer rack so as to engage the legs of a shrimp carried by said transfer rack, means connected to said cleaning means for driving said cleaning means to remove the legs from shrimp engaged by said cleaning means, shell removing means mounted and positioned on said supporting structure adjacent the path of movement of said transfer rack so as to engage the shell of a shrimp carried by said transfer rack, said shell removing means being operable to remove the shell from a shrimp carried by said rack, cutter means mounted and positioned on said supporting structure adjacent the path of movement of said rack so as to engage the back of a shrimp carried by said rack after at least a portion of the shell has been removed and to slit the shrimp for removal of the vein in the back thereof.

4. In apparatus for cleaning and deveining shrimp, a supporting structure, a rack mounted on said supporting structure for movement of shrimp along a predetermined path, motive power means connected to said rack for imparting movement to said rack, brush means rotatably mounted to said supporting structure and positioned adjacent the path of movement of said rack so as to engage the legs of a shrimp carried by said rack, means connected to said brush means for driving said brush means to remove the legs from shrimp engaged by said brush means, shell removing means rotatably mounted to said supporting structure and positioned adjacent the path of movement of said rack so as to engage the shell of a shrimp carried by said rack, means connected to said shell removing means for rotating said shell removing means to remove the shell from a shrimp carried by said rack, and cutter means rotatably mounted on said supporting structure and positioned adjacent the path of movement of said rack so as to engage the back of a shrimp carried by said rack after at least a portion of the shell has been removed and to slit the shrimp for removal of the vein in the back thereof.

5. In apparatus for cleaning and deveining shrimp, a supporting structure, a transfer rack mounted on said supporting structure for movement along a predetermined path, movably mounted feeder means associated with said supporting structure adjacent said transfer rack for feeding shrimp to said transfer rack, motive power means connected to said transfer rack and said feeder means for imparting cooperative movement to said transfer rack and said feeder means, brush means rotatably mounted on said supporting structure and positioned adjacent the path of movement of said transfer rack so as to engage the legs of a shrimp carried by said transfer rack, means connected to said brush means for driving said brush means to remove the legs from shrimp engaged by said brush means, shell removing means rotatably mounted on said supporting structure and positioned adjacent the path of movement of said transfer rack so as to engage the shell of a shrimp carried by said transfer rack, means connected to said shell removing means for rotating said shell removing means to remove the shell from a shrimp carried by said transfer rack, and cutter means rotatably mounted on said supporting structure and positioned adjacent the path of movement of said transfer rack so as to engage the back of a shrimp carried by said transfer rack after at least a portion of the shell has been removed and to slit the shrimp for removal of the vein in the back thereof.

6. In apparatus for cleaning and deveining shrimp, a supporting structure, a transfer rack mounted on said supporting structure for movement of shrimp along a predetermined path, delivery means movably mounted adjacent said transfer rack, motive power means connected to said transfer rack for imparting cooperative movement to said transfer rack and said delivery means, brush means rotatably mounted on said supporting structure and positioned adjacent the path of movement of said transfer rack so as to engage the legs of a shrimp carried by said transfer rack, means connected to said brush means for driving said brush means to remove the legs from shrimp engaged by said brush means, shell removing means rotatably mounted on said supporting structure and positioned adjacent the path of movement of said transfer rack so as to engage the shell of a shrimp carried by said transfer rack, means connected to said shell removing means for rotating said shell removing means to remove the shell from a shrimp carried by said transfer rack, cutter means rotatably mounted on said supporting structure and positioned adjacent the path of movement of said transfer rack so as to engage the back of a shrimp carried by said transfer rack after at least a portion of the shell has been removed and to slit the shrimp for removal of the vein in the back thereof, said delivery means being arranged to engage shrimp carried by said transfer rack so that a shrimp can be taken from said transfer rack by said delivery means.

7. In apparatus for cleaning and deveining shrimp, a supporting structure, a transfer rack mounted to said supporting structure for movement along a predetermined path, movably mounted feeder means connected to said supporting structure adjacent said transfer rack for feeding shrimp to said transfer rack, delivery means also connected to said supporting structure and movably mounted adjacent said transfer rack, motive power means for imparting cooperative movement to said transfer rack and said feeder means and said delivery means, brush means rotatably mounted to said supporting structure and positioned adjacent the path of movement of said transfer rack so as to engage the legs of a shrimp carried by said transfer rack, means connected to said brush means for driving said brush means to remove the legs from shrimp engaged by said brush means, shell removing means rotatably mounted to said supporting structure and positioned adjacent the path of movement of said transfer rack so as to engage the shell of a shrimp carried by said transfer rack, means connected to said shell removing means for rotating said shell removing means to remove the shell from a shrimp carried by said transfer rack, cutter means rotatably mounted to said supporting structure and positioned adjacent the path of movement of said transfer rack after at least a portion of the shell has been removed and to slit the shrimp for removal of the vein in the back thereof, said delivery means being arranged to engage shrimp carried by said transfer rack so that a shimp can be taken from said transfer rack by said delivery means.

8. In apparatus for cleaning and deveining shrimp, a supporting structure, a transfer rack mounted to said supporting structure for movement along a predetermined path, movably mounted feeder means connected to said supporting structure adjacent said transfer rack for feeding shrimp to said transfer rack, delivery means also movably mounted to said supporting structure and adjacent said transfer rack, motive power means connected to said transfer rack and said feeder means for imparting cooperative movement to said transfer rack and said feeder means and said delivery means, releasable holding means connected to said transfer rack for transferring shrimp from said feeder means to said transfer rack, brush means rotatably mounted to said supporting structure and positioned adjacent the path of movement of said transfer rack so as to engage the legs of a shrimp carried by said transfer rack, means connected to said brush means for driving said brush means to remove the legs from shrimp engaged by said brush means, shell removing means rotatably mounted to said supporting structure and positioned adjacent the path of movement of said transfer rack so as to engage the shell of a shrimp carried by said transfer rack, means connected to said shell removing means for rotating said shell removing means to remove the shell from a shrimp carried by said transfer rack, cutter means rotatably mounted to said supporting structure and positioned adjacent the path of movement of said transfer rack so as to engage the back of a shrimp carred by said transfer rack after at least a portion of the shell has been removed and to slit the shrimp for removal of the vein in the back thereof, said delivery means being arranged to engage shrimp carried by said transfer rack, and means positioned adjacent the path of movement of said transfer rack to release said holding means so that a shrimp can be taken from said transfer rack by said delivery means.

9. In apparatus for cleaning and deveining shrimp, a supporting structure, a transfer rack mounted to said supporting structure for movement along a predetermined path, movably mounted feeder means connected to said supporting structure adjacent said transfer rack for feeding shrimp to said transfer rack, delivery means also movably mounted to said supporting structure adjacent said transfer rack, motive power means connected to said transfer rack and said feeder means and said delivery means for imparting cooperative movement to said transfer rack and said feeder means and said delivery means, releasable holding means associated with said transfer rack for transferring shrimp from said feeder means to said transfer rack, brush means rotatably connected to said supporting structure and otherwise movably mounted and positioned adjacent the path of movement of said transfer rack so as to engage the legs of a shrimp carried by said transfer rack, means for rotating said brush means to brush the legs from a shrimp engaged by said brush means, shell removing means rotatably mounted to said supporting structure and otherwise movably mounted and positioned adjacent the path of movement of said transfer rack so as to engage the shell of a shrimp carried by said transfer rack, means connected to said shell removing rack, means for rotating said shell removing means to remove the shell from at least a part of a shrimp carried by said transfer rack, cutter means rotatably connected to said supporting structure and otherwise movably mounted and positioned adjacent the path of movement of said transfer rack so as to engage the back of a shrimp carried by said transfer rack after at least a portion of the shell has been removed and to slit the shrimp for removal of the vein in the back thereof, fantailing means connected to said supporting structure and operable to move said brush means and said shell removing means and said cutter means away from a shrimp carried by said transfer rack in order to leave a portion of the shell on the shrimp, said delivery means being arranged to engage shrimp carried by said transfer rack, and means connected to said supporting structure and positioned adjacent the path of movement of said transfer rack to release said holding means so that a shrimp can be taken from said transfer rack by said delivery means.

10. In apparatus for cleaning and deveining shrimp, a supporting structure, a transfer rack mounted on said supporting structure for movement along a predetermined path, a movably mounted feeder chain connected to said supporting structure adjacent said transfer rack for receiving shrimp, a delivery chain also movably mounted to said supporting structure adjacent said transfer rack, motive power means connected to said supporting structure for imparting cooperative movement to said transfer rack and said feeder chain and said delivery chain, releasable holding means on said transfer rack for transferring shrimp from said feeder chain to said transfer rack, brush means rotatably mounted on said supporting structure and otherwise movably mounted and positioned adjacent the path of movement of said transfer rack so as to engage the legs of a shrimp carried by said transfer rack, means for rotating said brush to remove the legs of shrimp engaged by said brush, shell removing means rotatably and otherwise movably mounted to said supporting structure and positioned adjacent the path of movement of said transfer rack so as to engage the shell of a shrimp carried by said transfer rack, means connected to said shell removing means for rotating said shell removing means to remove the shell from at least a part of a shrimp carried by said transfer rack, cutter means rotatably and otherwise movably mounted to said supporting structure and positioned adjacent the path of movement of said transfer rack so as to engage the back of a shrimp carried by said transfer rack after at least a portion of the shell has been removed and to slit the shrimp for removal of the vein in the back thereof, fantailing means connected to said transfer rack and operated by movement of said transfer rack to move said brush means and said shell removing means and said cutter means away from a shrimp carried by said transfer rack in order to leave a portion of the shell on the shrimp, means on said delivery chain for engaging shrimp carried by said transfer rack, and means connected to said supporting structure positioned adjacent the path of movement of said transfer rack and being operable to release said holding means so that a shrimp can be taken from said transfer rack by said delivery chain.

11. In apparatus for cleaning and deveining shrimp, a supporting structure, a transfer rack mounted on said supporting structure for reciprocating movement along a predetermined path, a movably mounted feeder chain connected to said supporting structure adjacent said transfer rack for receiving shrimp, a delivery chain also movably mounted to said supporting structure adjacent said transfer rack, motive power means on said supporting structure for imparting cooperative movement to said transfer rack and said feeder chain and said delivery chain, releasable holding means on said transfer rack operated by movement of said transfer rack for transferring shrimp from said feeder chain to said transfer rack, brush means rotatably and otherwise movably mounted on said supporting structure and positioned adjacent the path of movement of said transfer rack so as to engage the legs of a shrimp carried by said transfer rack, means connected to said brush means for rotating said brush means to remove the legs of shrimp engaged by said brush, shell removing means rotatably and otherwise movably mounted and positioned adjacent the path of movement of said transfer rack so as to engage the shell of a shrimp carried by said transfer rack, means connected to said shell removing means for rotating said shell removing means to remove the shell from at least a part of a shrimp carried by said transfer rack, saw means rotatably and otherwise movably mounted on said supporting structure and positioned adjacent the path of movement of said transfer rack so as to engage the back of a shrimp carried by said transfer rack after at least a portion of the shell has been removed and to slit the shrimp for removal of the vein in the back thereof, fantailing means connected to said transfer rack and operated by movement of said transfer rack to move said brush means and said shell removing means and said saw means away from a shrimp carried by said transfer rack in order to leave a portion of the shell on the shrimp, means on said delivery chain for engaging shrimp carried by said transfer rack, and means on said supporting structure and positioned adjacent the path of movement of said transfer rack and being operable to release said holding means so that a shrimp can be taken from said transfer rack by said delivery chain.

References Cited in the file of this patent

UNITED STATES PATENTS

| Number | Name | Date |
| --- | --- | --- |
| 1,267,850 | Cooper | May 28, 1918 |
| 1,627,479 | Bucknam | May 3, 1927 |
| 1,677,579 | Barry | July 17, 1928 |
| 2,263,697 | Grayson | Nov. 25, 1941 |
| 2,299,774 | Weems | Oct. 27, 1942 |
| 2,301,729 | Krull | Nov. 10, 1942 |